Dec. 3, 1968
M. N. JANAPOL
3,413,849
LABORATORY BEDDING TEST MACHINE
Filed Dec. 30, 1965
2 Sheets-Sheet 1
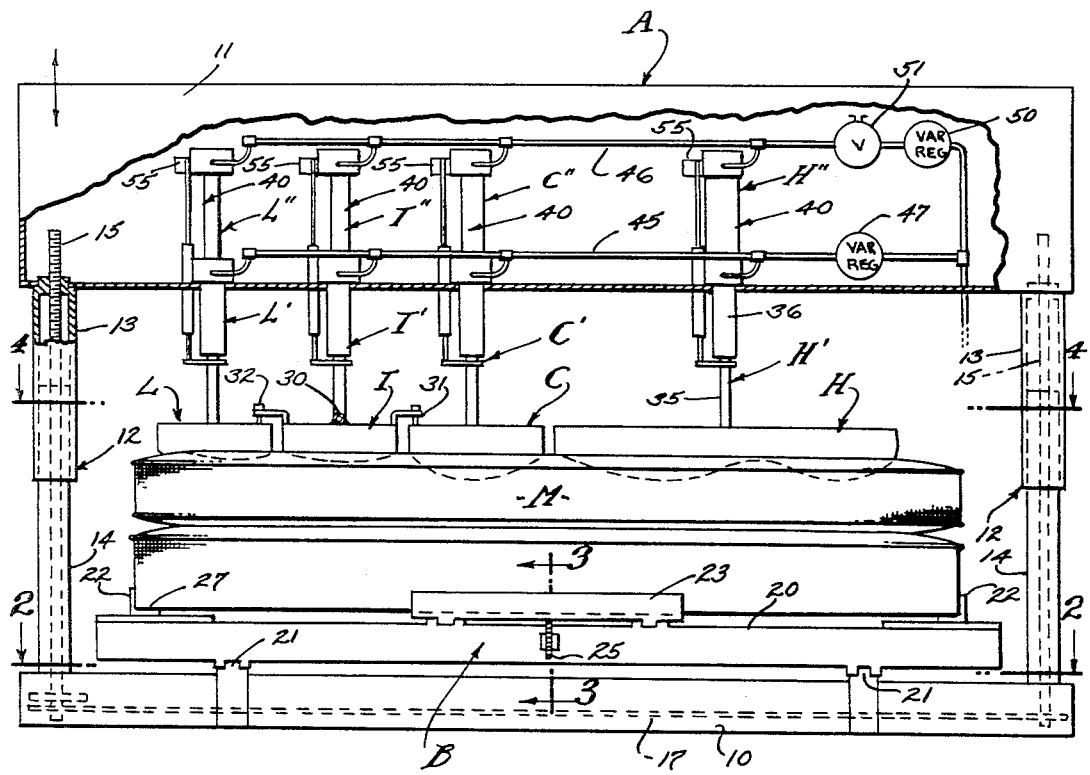
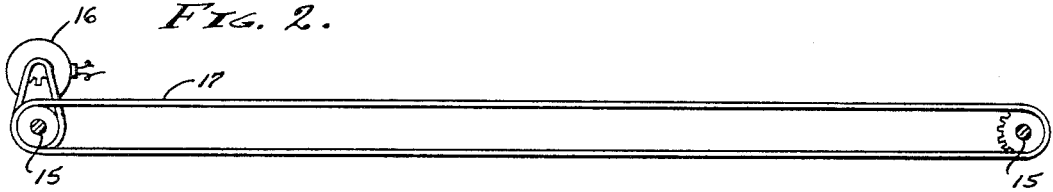
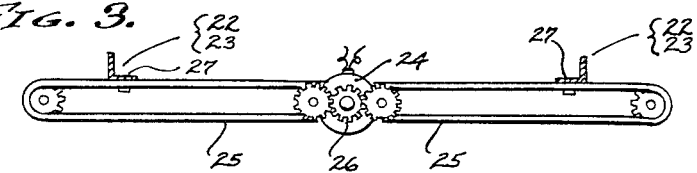
INVENTOR.
MELVIN N. JANAPOL
BY
AGENT Dec. 3, 1968 M. N. JANAPOL 3,413,849
LABORATORY BEDDING TEST MACHINE
Filed Dec. 30, 1965 2 Sheets-Sheet 2
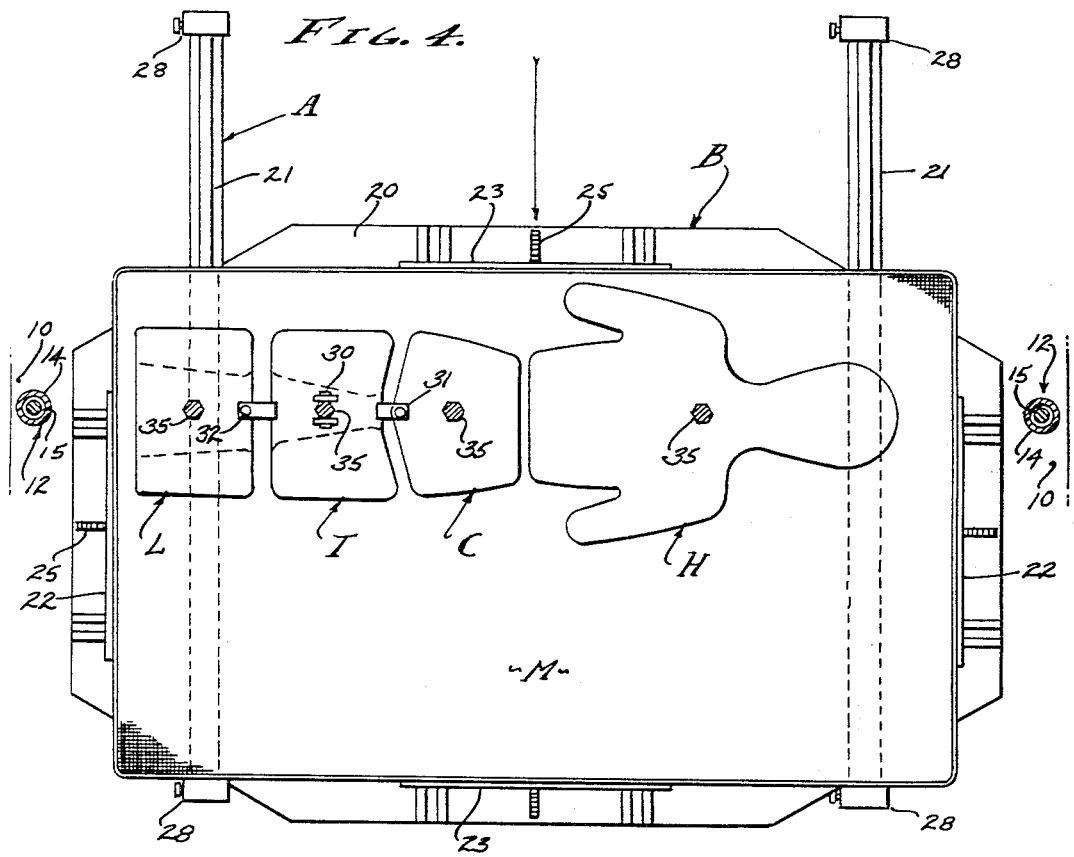
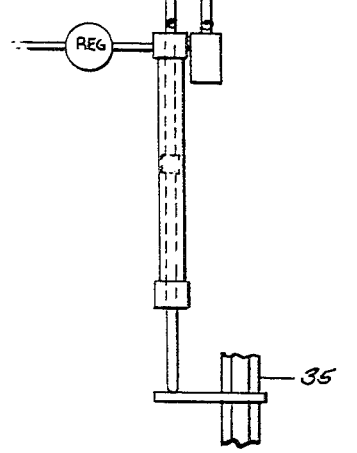
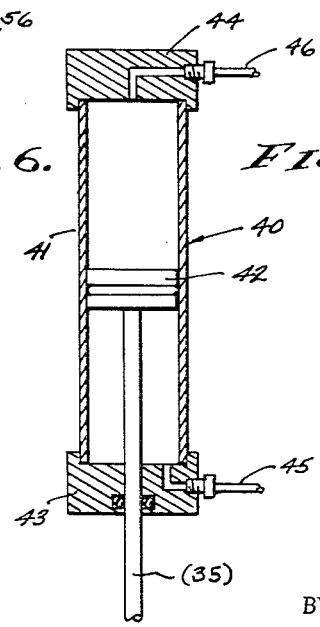
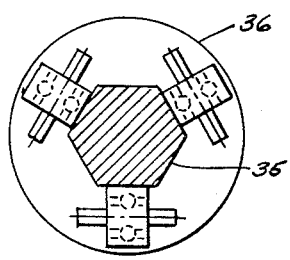
INVENTOR.
MELVIN N. JANAPOL
BY
AGENT

United States Patent Office 3,413,849
Patented Dec. 3, 1968

3,413,849
LABORATORY BEDDING TEST MACHINE
Melvin N. Janapol, Los Angeles, Calif., assignor to Wortso Corporation, Los Angeles, Calif., a corporation of California
Filed Dec. 30, 1965, Ser. No. 517,732
3 Claims. (Cl. 73—161)

ABSTRACT OF THE DISCLOSURE

This invention is concerned with improvements in bedding testing machines employed for the depressing of the simulated human form into mattresses or the like, whereby the functions of the mattress can be observed and recorded. Variably selected weights are applied in order to simulate a person's body of prescribed weight, by direct means applying specified proportionate weights, and adapted to retract the same. Specifically, cylinder and piston means of proportionate cross sectional effective area are employed and associated with respective proportionate weights of the body portions that they represent, and fluid pressure is selectively applied thereto through a common pressure source, whereby the selective adjustment of a single control establishes the overall weight of the simulated body form. Further, a shiftable mattress support table is provided and upon which said mattress is centered for testing of pre-selected areas thereof.

---

Mattress testing has been accomplished realistically and according to natural weights and articulations of the human anatomy, reference being made to my previous Patent 3,195,347 entitled, Bedding Testing Machine. Generally, it is recognized that the human being suffers from certain muscular and skeletal problems, for example, spinal conditions resulting from incorrect posture or from injury. In any case, resort is made to various modifications, in bedding upon which said persons lie, the purpose being to correct and alleviate malconditions of said person. Obviously, different persons vary greatly in stature, weight and contour, and for this reason a device for simulating persons must be versatile, it being the general object of this invention to provide improvements in a machine such as is disclosed in said patent, whereby depression of the human form into a mattress is simulated.

Although the prior art teaches machines which satisfactorily test mattresses and the like, the machine of my previous above mentioned patent, for example, is characterized by mechanical complexity in order to gain the desired results. In an effort to perfect such a machine and to reduce it to a most simple and practical form, I have now provided such a machine wherein heavy weights are eliminated, and wherein mechanical parts are reduced to a minimum. Recognizing that selectively different weight is to be applied proportionately at respectively different body portions, my previously patented concept provides a balance of weights; wherein a full weight is applied at each body portion and wherein a fulcrum shiftably supports a weighted lever so as to selectively, and again proportionately, subtract weight at each of said body portions. Thus, it is the proportionate and variably selected weights that must be applied to the composite of body portions, in order to simulate a person's body of prescribed overall weight; it being a general object of this invention to provide an improved and direct means for applying such specified proportionate weights and to retract the same.

A general object of this invention is to provide a machine of the character referred to for testing mattresses and the like according to specified simulated weights of a person, and thereby to determine the capability of the said mattress in supporting such a person.

It is an object of this invention to provide a composite body form, simulating the human form, wherein articulating body portions of known proportionate weights are depressed into a mattress according to an overall weight prescribed for said depression, and to retract said composite body form.

It is an object of this invention to provide a selectively shiftable mattress holding means that clamps the mattress in predetermined centered locations. With the holding means hereinafter described, there is a shiftable mattress supporting table upon which said mattress is centered by right angularly related clamp means. By locating the mattress through releasable operation of the said clamping means and by selective placement of the table supporting the same, said table being shiftable to and/or between stops, testing of predetermined mattress areas is accurately accomplished.

The various objects and features of this invention will be fully understood from the following detailed description of the typical preferred form and application thereof, throughout which description reference is made to the accompanying drawings, in which:

FIG. 1 is a side elevation of the test machine illustrating a mattress and box springs therein as they would appear undergoing testing.

FIGS. 2 and 3 are fragmentary views taken substantially as indicated by lines 2—2 and 3—3 on FIG. 1, FIG. 2 showing elements of the elevating means and FIG. 3 showing elements of the clamping means.

FIG. 4 is a plan view taken as indicated by line 4—4 on FIG. 1.

FIGS. 5, 6 and 7 are enlarged detailed views of the position indicating means, force exerting means and part guiding means, respectively.

The machine herein disclosed is especially constructed for testing of mattresses or the like, such as the box springs that are usually employed to underlie a mattress, it being important that the exact environment be simulated for a particular application of weight by the human body form. Therefore, various sized bedding units are to be accommodated within the machine and the position of the bedding units is adjustable relative to the human body form to be depressed therein.

The machine as it is illustrated throughout the drawings involves, generally, a frame A, a selectively positionable mattress holding means B, a plurality of simulated human body parts including a head and thoractic part H, a leg part L, a thigh part T, and an intermediate abdominal and buttock part C. In addition to the above mentioned visible parts the machine involves individual carriages H', L', T' and C' for restricting the parts H, L, T and C to vertical movements independent of each other, and in accordance with the invention proportionate depressing forces are applied to said parts H, L, T and C by means H'', L'', T'' and C'' that are operable to balance and to alternately depress and to retract said parts through operation of a single control means D. The affect of the said parts H, L, T and C upon a mattress M is detected and evidenced for recordation by a position indicator I at each of said carriages H', L', T' and C'.

The frame A is an elongated rectangular structure that is horizontally disposed, the simulated weight of depression being applied to a mattress M in a direction normal to the said horizontal disposition. The frame A is dimensionally larger than any mattress to be tested and has a base 10 and a header 11 with a pedestal 12 therebetween to hold the header 11 positioned substantially above the base 10. In accordance with the invention the header 11 is adjustably positionable above the base 10, and the pedestals 12 are extensible so as to effect such adjustment. As shown, each pedestal 12 is a telescoping unit comprised of a cylindrical guide 13 depending from the header 11 on a vertical axis and a column 14 erecting from the base 10. In practice, the telescoping unit 13–14 is both collapsible and extensible through the rotation of an elevating screw 15 rotatably supported by the column 14 and threadedly carrying the guide 13. The height position of the header 11 as it is supported by the two screws 15 is accurately established by means of a motor 16 and chain drive 17 that simultaneously revolves the screws of the two units. The motor 16 is reversibly operable and stopped so as to adjustably select the height to which the header 11 is to be elevated. The frame A made up of the parts 10–17 remains a rigid structure at any height selected for support of the header 11, the rectangular plan configurations of the base and header being in spaced parallel horizontally disposed planes.

The mattress M to be tested can vary widely in shape and detail of construction, and this is also true of the box spring units (not shown). Generally, the mattress M and/or box spring units are rectangular pad-shaped elements composed of flat top and bottom sides comprised of padding covered with ticking and with coil springs therebetween. The springs and padding vary widely, and generally speaking it is the combined function of said springs and padding that is to be tested. The overall firmness of the mattress M can vary, the overall thickness of said mattress M can also vary, and it is the resultant height relation of the parts H, L, T and C with which the present machine is primarily concerned.

The selectively positionable mattress holding means B is a controllably shiftable table 20 that overlies the base 10 and underlies the header 11 of the frame A. The table 20 is a flat rectangular frame structure that is adapted to clamp the mattress M in working position, there being a pair of spaced transversely disposed parallel rails 21 upon which the table as a whole is selectively positionable. The means B comprises two right angularly related pairs of opposed jaws 22 and 23. The opposed faces of the two pairs of jaws remain parallel with each other respectively, so as to engage with opposite ends and opposite sides of the mattress, for clamping the same in position. As is illustrated, the opposed jaws 22 and 23 move together and/or apart as by means of a motor 24 and oppositely movable chain drives 25 driven thereby through a pinion 26. The motors, drives and pinions are the same for both jaws 22 and jaws 23.

The selectively positionable feature of means B is provided for in the track 21 support for the table 20 and wherein the said table is positionable from side to side, thereby to bring selectively different areas of a mattress into play beneath the body simulating parts H, L, T and C. In practice, each of the jaws 22 and 23 has a shoulder 27 upon which the mattress can rest, said shoulders being at a coincidental height. The rails 21 are about half again the width of the mattress M (as when a double mattress is being tested) and with selectively positionable side stops 28, so that the table 20 with said mattress M thereupon can be alternately shifted for the testing of each of the two side areas thereof, for example. In accordance, with the invention, the jaws are automated as above described so as to centrally locate the mattress M both longitudinally and transversely, upon actuation of the two motors 24 to engage the jaws therewith. As a result, the jaws 22 and 23 move together or apart in a manner to center or release the mattress M in positions to test the predetermined areas thereof as circumstances require.

The plurality of simulated human body parts H, L, T and C are formed to represent the shapes of (not necessarily the weight of) the corresponding parts of a normal person expected to use the mattress to be tested, for instance a normal person of 157 lbs. and with a stature of 5 feet 10 inches. Since a normal reclined posture is to lie down on one's back, it is the posterior of the human form which is to be considered and to this end the parts H, L, T and C are shaped to represent the posterior shapes of the head and thoracic regions, the leg region, the thigh region and the abdominal and buttock regions.

In accordance with the invention it is significant that the regional divisions represented by the parts H, L, T and C are employed, since the greatest amount of mattress depression is experienced beneath part C representing the abdominal and buttock regions, while a lesser amount of mattress depression is experienced beneath parts H, L and T. Furthermore, it is the back regions of the human body which are of prime concern, especially at or near the junction of the regions represented by parts H and C. Therefore, since the junction of the head and thoracic regions are not of prime concern, ordinarily, these two body regions are advantageously combined as one in the part H and depressed to correspond to the combined weights of those regions in a normal person. Accordingly, the abdominal and buttock part C is also combined and depressed to correspond with the weights of those regions in a normal person. In practice, the parts H and C are separated by a minimum but adequate gap so as not to touch or interfere one with the other. Further, the leg region represented by part L is sectional and divided into articulated thigh and calf part T and L and each of which is depressed to correspond to the weights of those regions in a normal person. The thigh part T is pivoted at 30 on a horizontal transverse axis and has a projecting lever 31 to engage the top of the adjacent end of part C, and has a projecting lever 32 to engage the top of the leg part L. In the case of each lever 31 and 32, there is an adjustment screw to pivotally engage the adjacent part and section. All of said parts spaced with a minimum gap therebetween, the same as parts H and C.

The carriages H', L', T' and C' can vary widely and are provided to movably guide the parts H, L, T and C for substantially free vertical movement. That is, the parts H, L, T and C are free to fall by virtue of their respective weights and they are equally free to be lifted. As shown, the carriages H', L', T' and C' are alike and each involves a polygonal slide rod 35 disposed vertically on an axis substantially aligned with the center of gravity of the parts guided thereby and guide means 36, preferably a roller guide as is indicated, rotationally restricting the slide rods 35 and limiting them to said vertical movement. The slide rods 35 are rigidly coupled to parts H and C, and while the one slide rod 35 is pivotally coupled at 30 to the thigh section T.

In accordance with the invention the weight of each part H, L, T and C together with its associated carriage parts H', L', T' and C' corresponds proportionately to the weight of the respective body part that it represents. In practice, each of said parts weighs substantially less than the represented human body part, and each part is of the same proportionate representation. Therefore, the simulating parts H, L, T and C and associated carriages and any other related elements are weighted so as to each represent substantially the same percentage of the body weight, in each instance. The addition of ballast weight (not shown) is employed for this purpose.

The means H", L", T" and C" that are operable to balance and to alternately depress and to retract the simulating body parts H, L, T and C are essentially alike and in accordance with the invention vary in their force exerting capacity correspondingly with the weight of the respective human body part controlled. Each of these said means has three recited functions (1) to balance, (2) to depress and (3) to retract and each involves, generally, a fluid operated cylinder and piston motor 40 that is vertically disposed and adapted to depress and to lift the slide rod 35 of a carriage. Accordingly, the operational cross sectional area of each motor 40 is made to effect a reciprocating forceful movement, either upwardly or downwardly, in proportion to the weight of the part H, L, T or C, in which case the effective diameter of the motor 40 in the means H" is much the larger, followed by the somewhat lesser diameter of the motor 40 in means C", then followed by the substantially lesser diameter of the motor 40 in means T", and finally by the least diameter of the motor 40 in means L". In actual practice, the above stated relationship of effective piston diameters is as follows: H"=2 inches; C"=1¼ inches, T"=1 inch and L"=¾ inch; and in the machine as actually constructed these diameters represent satisfactory ratios as between the representative weights of the various body parts as they are shown.

The motor 40, as is indicated above, involves a cylinder 41 and a piston 42 and in accordance with the invention is a double acting unit with the slide rod 35 of the carriage to which it is related entering through a head 43 at the low end of the cylinder and coupled to the piston 42 to be operated thereby. The head 43 is anchored and is sealed with and slideably passes the slide rod 35, and the top end of the cylinder is closed by a head 44. The motor 40 is employed to apply forces to move the slide rod 35 both upward and downward and applies said forces simultaneously in said up and down directions, thereby effecting both a balancing function and a depressing or retracting function as may be required. To these ends, therefore, the head 43 receives a fluid handling line 45 and the head 44 receives a fluid handling line 46, each of which lines is controlled so as to apply fluid under suitable pressure or to exhaust the same.

The balancing effect afforded by the motor 40 of the means H", L", T" and C" is gained through the application of an exacting fluid pressure to the lines 45, and in accordance with the invention one and the same pressure is applied to all of said means in common. Although various types of valving and controls can be employed, the basic concept herein involves a pressure regulated supply of fluid through the lines 45 to act beneath the piston 42 to lift the same, and this fluid pressure is adjustably regulated so as to exert an upward force on the slide rod 35 to equal its weight and all parts connected therewith. To this end I provide an adjustable pressure regulator 47 which can be placed at a setting for the said exact balance of the parts referred to. Still further, and a typical means of control for the retraction of the moving parts, the pressure regulator 47 is variable and is operable to a position to pass a somewhat higher pressure than the above mentioned adjusted balancing pressure. Therefore, in addition to the balancing effect, said variable pressure regulated fluid supply to the motor 40 affords a lifting effect when so controlled. In practice it is satisfactory to adjust the balancing pressure somewhat in excess to thereby cause lifting of the slide rod 35 and attached simulating body parts.

The depressing and retracting effect afforded by the motor 40 of the means H", L", T" and C" is gained through the application of selectively exacting fluid pressure to the lines 46, and in accordance with the invention one and the same pressure is applied to all of said means in common. Although various types of valving and controls can be employed, the basic concept herein involves a pressure regulated supply of fluid through lines 46 to act above the pistons 42 to depress the same, and this fluid pressure is adjustably regulated so as to exert a downward force on the slide rod 35 when the above mentioned regulator 47 is applying a balancing pressure. To this end I provide a selectively adjustable pressure regulator 50 which can be placed at a setting for establishing the weight of the person to be simulated. As is indicated, the regular 50 supplies the lines 46 through a two position valve 51 which is placeable in one position to admit regulated fluid pressure into the cylinders 40 and in a second position to exhaust fluid from the cylinders 40. Thus, the above mentioned regulator 47 is effective when set in its second mentioned position to retract the parts H, L, T and C.

Observations and/or recording of the depression of the individual parts H, L, T and C is provided for by the position indicator I at each of said individual parts. The indicator I can vary and is shown as an electronic type means wherein a potentiometer 55 follows the movement of the slide rod 35. In its preferred form, the indicator I involves a relatively small diameter cylinder and piston motor that yieldingly urges a follower into light pressure contact with the simulated body part, or a part associated therewith (see FIG. 5) and a chain drive to a sprocket that revolves the potentiometer 55. The consequent position of the potentiometer 55 is then read or recorded as an instrument reading, such as a galvanometer reading, or by means of a digital readout voltmeter 56, or the like. As shown, the plurality of potentiometers 55 are supplied with a constant electrical power source 57 and to the end that the readout voltmeter 56 indicates the relative depression of the parts H, L, T and C.

From the foregoing it will be seen that the multiplicity of individual simulated body parts H, L, T and C can be depressed into the mattress M with the total force equal to the weight of persons desired to be simulated. Upon depression of the said parts into the mattress the position indicators show the amount of said depression as above stated. The balance of said parts H, L, T and C is effected by the motors 40 which are simultaneously employed to effect the depressing force, and which upon release of the fluid pressure permit retraction of the parts H, L, T and C through the increased pressure applied beneath the pistons of the motors 40. As a result, common fluid pressures are applied to the upper and lower heads of the motors 40, said pressures, in each instance, being regulated selectively and adjustably or variably.

Having described only a typical preferred form and application of my invention, I do not wish to be limited or restricted to the specific details herein set forth, but wish to reserve to myself any modifications or variations that may appear to those skilled in the art.

Having described my invention, I claim:

1. A machine for testing bedding by simulating the depression of the human form therein, and including, a frame, means to support the bedding in the frame, a plurality of independent and vertically movable parts measurably positioned in the frame to rest upon the bedding and each having a form simulating a part of the human body, controlled means comprising a cylinder and piston motor for each of said plurality of parts and each with a cylinder diameter to effect a moving force proportionate to the corresponding proportionate weight of the independent body part moved thereby, wherein a fluid pressure means supplies the cylinder and piston motors of the controlled means in common above the pistons thereof from a regulated fluid pressure source, to thereby adjust the weight of said plurality of parts and associated elements attached thereto, wherein a fluid pressure means supplies the cylinder and piston motors of the controlled means in common below the pistons thereof from a regulated fluid pressure source to nulify the weight of said plurality of parts and associated elements attached thereto, and wherein the first mentioned fluid pressure means that supplies the cylinders of said controlled means above the pistons thereof is operable simultaneously with operation of the second mentioned fluid pressure means so as to establish the overall weight of the human form simulated.

2. A machine for testing bedding by simulating the depression of the human form therein, and including, a frame, means to support the bedding in the frame, a plurality of independent parts measurably positioned in the frame to rest upon the bedding and each having a form simulating a part of the human body, and controlled means comprising a cylinder and piston motor for each of said plurality of parts and each with a cylinder diameter to effect a moving force proportionate to the corresponding proportionate weight of the independent body part moved thereby, and wherein the cylinder and piston motors of the controlled means are supplied in common below the pistons thereof from a dual pressure regulated fluid pressure source, operable at one pressure to equal the weight of said plurality of parts and associated elements attached thereto, and operable at a second pressure to exceed the weight of said plurality of parts so as to retract them from the bedding.

3. A machine for testing bedding as set forth in claim 2 and wherein the cylinder and piston motors of the controlled means are also supplied in common above the pistons thereof from an independently regulated fluid pressure source, the fluid pressure applied above being exhaustibly regulated and operable to releasably establish the overall weight of the human form simulated, and the fluid pressure applied below being operable at said second pressure to exceed the weight of said plurality of parts so as to retract them from the bedding when fluid pressure is exhausted from above the pistons.

References Cited

UNITED STATES PATENTS

| | | | |
|---|---|---|---|
| 455,196 | 6/1891 | Fulmer et al. | 269—218 X |
| 2,301,841 | 11/1942 | Zeder | 73—161 |
| 3,195,347 | 7/1965 | Janapol | 73—172 X |
| 3,244,291 | 4/1966 | Dexter | 269—218 X |
| 3,334,517 | 8/1967 | Janapol | 73—94 |
| 1,723,050 | 8/1929 | Malarkey | 269—218 X |

FOREIGN PATENTS

| | | |
|---|---|---|
| 797,663 | 7/1958 | Great Britain. |

RICHARD C. QUEISSER, *Primary Examiner.*

JAMES H. WILLIAMSON, *Assistant Examiner.*